United States Patent Office 2,754,292
Patented July 10, 1956

2,754,292

PRECIPITATION OF PROTEINS

Richard Henderson, Chappaqua, and Richard J. Block, Scarsdale, N. Y., assignors to The Borden Company, a corporation of New Jersey No Drawing. Application June 20, 1955,
Serial No. 516,788

6 Claims. (Cl. 260—115)

This invention relates to the process of recovering whey protein, principally lactalbumin, from whey by precipitation with an iron salt.

Copending application of Block and Bolling, Ser. No. 285,802, filed May 2, 1952, for Making Ferrilactin and issued as Patent 2,710,858, describes the precipitation of proteins from whey by means of ferric iron, the precipitate being now known as ferrilactin. In making this ferrilactin, Block and Bolling used sufficient ferric salt to give the ferrilactin precipitate, a product containing protein material with about 10%–20% of its weight of iron calculated as Fe. With proportions of iron below this range, the precipitation of the ferrilactin is incomplete. Also we have found that the precipitation with ferric iron, as described in the said application, gives ferrilactin in fine condition that is difficult to filter at a rate satisfactory in commercial operations.

This invention provides a process for precipitation of whey proteins or the like, with commercially satisfactory yields and with the use of a much smaller proportion of the iron ion than required in the process of Block and Bolling. It provides also a product of low iron content and of good filtration characteristics.

Briefly stated, the invention comprises the method of and the product resulting from mixing a soluble ferrous salt with whey or the like, adding an acidic material in amount, if any, required to lower the pH to below that at which the ferrous salt precipitates whey protein, and then oxidizing the ferrous salt to ferric, so as to form a precipitate of ferric iron and whey protein combination, and then separating the ferrilactin so precipitated from the remaining aqueous phase.

In this manner we have been able to make a ferrilactin with yields as high as 0.92 pound for 100 pounds of whey used, as the average of several runs with batches up to 7055 lbs. of whey per batch. This weight yield is about 70% greater than the yield of lactalbumin by the conventional process involving precipitation by heating the whey. The nitrogen removal from the whey was about 21% greater than by the heating method. The ferrilactin so precipitated, filtered through cloth at the start of the cycle at the rate of ¼ gal. per minute for each square foot of filter area with gravity feed and an average head of 2 feet of liquid on the filter. The rate was approximately ⅕ gal. after 10 minutes. With pump pressure then applied, a firm cake 1 inch thick was built in 4 hours at the maximum pressure of 150 p. s. i.; the filtrate remained clear.

The process in general is as follows: Whey is mixed with a ferrous salt of which an example is technical ferrous chloride ($FeCl_2 \cdot 2H_2O$). The pH is established as that at which any precipitation formed on addition of the ferrous salt is redissolved or no precipitate is formed with the ferrous ion in contact with the whey proteins. Then the mixture, while under good agitation, is oxidized by the addition of an oxidizing agent thereto, the whole being maintained at a temperature below that of heat denaturing of the protein present until ferrous iron is oxidized to ferric in amount to precipitate substantially all of the protein of the whey. Then the precipitate is filtered, washed, and carefully dried. It is not necessary to oxidize all the ferrous iron to ferric. It is sufficient to conduct the oxidation until the ferrilactin precipitation substantially ceases and then to discontinue oxidation of any remaining ferrous ion. This requires ordinarily oxidation of a major part of the ferrous iron to ferric.

The product so made has been found to contain approximately 4%–6% of iron calculated as Fe on the dry basis. This relatively low content of iron is not only adequate to give the desired high yield of precipitated protein but also better filtration rate for the product than with larger proportions of iron.

The product so made is useful as a food. If a food supplement of high iron content is desired, the ferrilactin is employed as such. For most purposes, however, the iron is removed. It may be removed, for instance, as described in the said application of Block and Bolling. Thus the iron may be removed by a cation exchanger adjusted to the acid cycle, either before or after reduction of the ferric to ferrous iron as by dithionate reducing agent.

Following the reduction of the iron to the ferrous state, either before or after separation of the iron, the protein is heat coagulable. Long contact with the dithionate or with sulfurous acid, on the other hand, makes the final protein non-coagulable on heating of its aqueous solutions.

As to materials, we know of no protein solution which gives better results than whey. The whey may be any commercial variety. It may be cheese whey or whey from the acid precipitation of casein. We find particularly good results when the whey is relatively fresh as judged by the acid level, the freshness giving a better yield in our ferrilactin precipitation step than older whey of acidity above about 0.5% as lactic acid on the weight of the whey.

The acid used to adjust the pH of the whey before the precipitation is any food (non-toxic) acid that does not give a precipitate with ferrous ions in the concentrations used. Examples are hydrochloric, lactic, and sulfuric acids.

The ferrous salt mixed into the whey is any non-toxic water soluble ferrous salt. Examples are ferrous chloride, ferrous sulfate, and ferrous acetate. The iron salt used may also be a mixture of part ferric and part ferrous. Thus, we may use the ferric salt of any of the acids satisfactory with ferrous iron, in proportion to supply up to 20 parts of $Fe^{+++}$ for 80 of $Fe^{++}$.

The oxidizing agent used is ordinarily oxygen in gaseous form. Air is satisfactory for most purposes, although less foaming of the whey is given when the gas used is oxygen itself of commercial purity. As the oxidizing agent we may use also such mild oxidizing compounds as dilute aqueous solutions of hydrogen peroxide, peracetic acid, butyl peroxide, and benzoyl peroxide.

As to proportions, the ferrous salt is limited for best results to the amount supplying about 0.1 to 0.2 part by weight of iron as Fe for 100 parts of the whey. In general, the proportion of iron introduced into the solution is somewhat in excess of the amount which, after conversion to ferric form, precipitates with the protein. This amount that precipitates is about 4–6 parts of actual Fe for 100 of the ferrilactin precipitate. The proportion of iron introduced originally is kept below that large excess which, if used, slows down the rate of filtration objectionably.

As to conditions of operation, the control of pH of the mix including the ferrous salt in contact with the oxidizing agent is important. If any precipitate forms on stirring the ferrous salt into concentrated whey, for example, we add sufficient hydrochloric acid or like acidic material in amount to dissolve the precipitate. In any case, we add acid, if required, to establish the pH within the range about 4.0–4.5 and ordinarily close to 4.3. Under these conditions the ferrous precipitate of the whey proteins will not form, or if previously formed, will dissolve; the ferric precipitate of the protein, however, will appear at such pH as the ferrous ion is oxidized.

The oxidizing gas is introduced to advantage through a stainless steel sparger or other porous material, to insure fineness of bubbles and extensiveness of contact surface.

The temperature of oxidation is made as high as possible without denaturing the protein, the rate of oxidation being higher with higher temperatures within this range. While we prefer a temperature of about 52°–55° C. we find that unevenness of heating, at such average temperature, may cause local overheating and attendant heat denaturing of protein. For that reason we work ordinarily at temperatures of about 21°–43° C. With 30 lbs. gage per sq. in. of oxygen in each case, we have obtained the desired oxidation in 5 min. at 49° C. as compared to more than 30 minutes required at 21° C.

Higher pressures of oxygen favor more rapid oxidation. Thus, the oxidation to the stage of precipitation of whey proteins commercially is accomplished in 10 minutes at 49° C. with oxygen at a gage pressure of 10 lbs. per sq. inch, as compared to 13 minutes with oxygen at atmospheric pressure at the same temperature.

Completeness of protein precipitation for commercial purposes is shown, in our tests, by adding trichloracetic acid and hydrogen peroxide separately to the liquor obtained by filtering the oxidized mixture. The formation of no or only a very slight precipitate with either the trichloracetic acid or hydrogen peroxide shows the previous precipitation by the oxidized iron to have been satisfactory.

The filtration may be effected in usual types of pressure filters or by centrifugation against a filtering basket wall.

The filtered material is washed with water in usual manner but with the pH of the wash water adjusted suitably to about 4–4.5 and ordinarily to 4.3.

Finally, the filtered and washed ferrilactin is dried below the temperature of heat denaturing of protein and advantageously within the range 32°–43° C.

The invention will be further illustrated by description in connection with the following specific examples of the practice of it. In these examples the whey used was mostly from Cheddar cheese mixed in some cases with a small proportion of Swiss cheese whey.

*Example 1*

2550 lbs. of whey were heated to 52° C. by passage through a plate heat exchanger. Hydrochloric acid was added slowly to the whey in a glass lined tank, the acid being used in amount to establish the pH at 4.7. Then 12 lbs. of technical ferrous chloride ($FeCl_2.2H_2O$) were introduced, the whole thoroughly stirred, and the pH adjusted by the introduction of additional hydrochloric acid to 4.3.

Cylinder oxygen was then bubbled into the whey while stirring was continued. At a prevailing temperature of about 52° C. the oxidation was completed in 45 minutes.

The product was then filtered. The filtration rates are those stated above. The filter cakes were washed with water at 4.3 pH. They were finally back washed (in reverse direction) until the washings were lactose free. The remaining press cake was spread on trays and dried in air at a temperature estimated at about 38°–43° C.

*Example 2*

The procedure of Example 1 was followed except that the amount of whey used was 7055 lbs., the amount of the ferrous chloride hydrate introduced was 23 lbs., and the oxygen was introduced and maintained at a gage pressure of 2 lbs.

The oxidation was discontinued after 1 hour and 25 minutes when test with trichloracetic acid showed only a very slight positive test for proteins still in solution.

After the filter cakes had been washed, they were redissolved in water alkalinized to pH of approximately 7.

The resulting solution was then spray dried. The product was a finely divided powder of the ferric iron combination with whey protein called ferrilactin.

*Example 3*

Four batches, each using 3,400 lbs. of whey and 16 lbs. of $FeCl_2.2H_2O$, were run substantially as described in Example 1.

The analyses of the finished washed and dried precipitate from the four batches follow.

| Percent N | Percent Fe | Percent Ash | Percent $H_2O$ | Yield, Lbs. from 3,400 lbs. Whey |
|---|---|---|---|---|
| 7.95 | 5.6 | 15.35 | 7.17 | 29 |
| 8.33 | 5.7 | 15.44 | 9.44 | 28 |
| 8.07 | 6.0 | 15.59 | 5.10 | 38 |
| 8.44 | 5.8 | 15.48 | 6.21 | 30 |

The above four batches required 0.58 lb. of ferrous chloride and 0.064 lb. of oxygen, including mechanical losses, per pound of ferrilactin.

*Example 4*

The procedure of Example 1 is followed except that the ferrous chloride is replaced by an equivalent proportion (on the basis of iron content) of a mixture of ferric and ferrous chlorides containing 20% of the iron in the ferric and 80% in ferrous condition.

The filtration rate was reasonably satisfactory.

As an explanation of the improved filtration properties and substantial completeness of precipitation with the relatively small proportion of iron, we consider the reducing action of the ferrous ion upon the whey proteins followed by oxidation to have an important and desirable effect upon the coagulation and filtrability of the precipitated ferrilactin.

It will be understood that it is intended to cover all changes and modifications of the examples of the invention herein chosen for the purpose of illustration which do not constitute departures from the spirit and scope of the invention.

What we claim is:

1. In precipitating protein from whey, the process which comprises mixing a soluble ferrous salt with the whey, adding an acidic substance in amount if any required to establish the pH of the mixture at a level below that of precipitation of protein by ferrous iron, introducing an oxidizing agent into the mixture to oxidize the ferrous to ferric iron, and then separating the resulting precipitate from the aqueous phase.

2. The process of claim 1 in which the said oxidizing agent used is oxygen in gaseous form.

3. The process of claim 1 in which the pH to which the mixture is adjusted before the oxidizing agent is introduced is about 4–4.5.

4. The process of claim 1 in which the said mixture is maintained at all times below the temperature of heat denaturing of the protein and the ferrous salt is admixed in proportion to supply about 0.1–0.2 part by weight of iron for 100 parts of the whey.

5. The process of claim 1 in which the ferrous salt is mixed with a ferric salt in the proportion of not more than 20 parts by weight of ferric iron for 80 of ferrous iron.

6. The process of claim 1 which includes adding alkali to the said precipitate after separation from the aqeous phase in amount to establish the pH at about 7 and then spray drying the resulting solution.

References Cited in the file of this patent

UNITED STATES PATENTS 2,710,858   Block et al. _____ June 14, 1955

OTHER REFERENCES

Anson et al.: "Advances in Protein Chemistry," vol. III, p. 54 (1947).

Kendall, Smith's Inorganic Chemistry, p. 904, D. Appleton-Century Co. Inc., N. Y. (1937).

Block et al., C. A., vol. 48, p. 2164 (1954).